US012647289B2

(12) United States Patent　　　　　(10) Patent No.:　　US 12,647,289 B2

Collomosse et al.　　　　　　　　　　(45) Date of Patent:　　　　Jun. 2, 2026

(54) DECENTRALIZED PLATFORM FOR ARTIFICIAL INTELLIGENCE DATA PROVENANCE AND COMMODIFICATION

(71) Applicant: ADOBE INC., San Jose, CA (US)

(72) Inventors: John Collomosse, Surrey (GB); Andrew S. Parsons, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 157 days.

(21) Appl. No.: 18/172,714

(22) Filed: Feb. 22, 2023

(65) Prior Publication Data

US 2024/0281504 A1　　Aug. 22, 2024

(51) Int. Cl.
*G06F 21/10*　　　　(2013.01)
*G06Q 20/12*　　　　(2012.01)
*H04L 9/00*　　　　(2022.01)
*H04L 9/32*　　　　(2006.01)

(52) U.S. Cl.
CPC ............. *H04L 9/50* (2022.05); *G06Q 20/123* (2013.01); *G06Q 20/1235* (2013.01); *H04L 9/3213* (2013.01); *G06F 21/105* (2013.01); *H04L 9/3239* (2013.01); *H04L 9/3247* (2013.01); *H04L 2209/603* (2013.01)

(58) Field of Classification Search
CPC ................. G06F 21/105; H04L 9/3213; H04L 2209/603; H04L 9/50; H04L 9/3239; H04L 9/3247
USPC .......................................................... 705/51
See application file for complete search history.

(56) References Cited

U.S. PATENT DOCUMENTS

| | | | | |
|---|---|---|---|---|
| 12,170,803 | B2 * | 12/2024 | Dorogusker | ......... G06Q 20/123 |
| 2020/0005284 | A1 * | 1/2020 | Vijayan | ................ G06Q 20/065 |
| 2020/0027145 | A1 * | 1/2020 | Tuli | ................... G06Q 30/0609 |
| 2021/0035246 | A1 * | 2/2021 | Schouppe | ................ H04L 9/50 |
| 2021/0133713 | A1 * | 5/2021 | Wang | .................. G06Q 20/389 |
| 2022/0309491 | A1 * | 9/2022 | Shapiro | .................. G06F 21/64 |

(Continued)

FOREIGN PATENT DOCUMENTS

JP　　　　7339406 B1 *　9/2023

OTHER PUBLICATIONS

Rosenthol, et al, "The Content Authenticity Initiative: Setting the Standard for Digital Content Attribution", Adobe Technical Report, Aug. 2020, 28 pages.

(Continued)

*Primary Examiner* — Wodajo Getachew
(74) *Attorney, Agent, or Firm* — F. CHAU & ASSOCIATES, LLC

(57)　　　　　　　ABSTRACT

Systems and methods for managing rights for creative work are provided. One aspect of the systems and methods includes receiving, at a rights contract on a distributed virtual machine operated based on a public blockchain, input data including an ownership token identifier for an ownership token, where the ownership token indicates ownership of a creative work. Another aspect of the systems and methods includes obtaining, at the rights contract, an indication of usage rights for the creative work corresponding to the ownership token. Yet another aspect of the systems and methods includes minting, via the rights contract, a rights token corresponding to the ownership token, where the rights token includes a reference to the indication of the usage rights for the creative work.

20 Claims, 9 Drawing Sheets

(56) References Cited

U.S. PATENT DOCUMENTS

| | | | | |
|---|---|---|---|---|
| 2022/0329446 | A1* | 10/2022 | Jackson | H04L 9/3247 |
| 2022/0337439 | A1* | 10/2022 | McCoy | H04L 9/3213 |
| 2022/0337898 | A1* | 10/2022 | Dorogusker | H04N 21/2187 |
| 2022/0407702 | A1* | 12/2022 | Jakobsson | H04L 9/50 |
| 2023/0009908 | A1* | 1/2023 | Castinado | H04L 9/3242 |
| 2023/0011621 | A1* | 1/2023 | Jakobsson | H04L 9/3213 |
| 2023/0062776 | A1* | 3/2023 | Vosseller | H04L 9/50 |
| 2024/0020681 | A1* | 1/2024 | Finnerud | G06Q 20/3825 |
| 2024/0086915 | A1* | 3/2024 | Finlow-Bates | G06Q 20/123 |

OTHER PUBLICATIONS

C2PA Technical Specification, C2PA.org consortium, 120 pages.
Bui, et al, "RepMix: Representation Mixing for Robust Attribution of Synthesized Images", Collomosse Proc. ECCV 2022, arXiv preprint: arXiv:2207.02063v2 [cs.CV] Jul. 12, 2022, 25 pages.
Yu, et al, "Attributing Fake Images to GANs: Learning and Analyzing GAN Fingerprints", In Proc. ICCV., pp. 7556-7566, arXiv preprint: arXiv:1811.08180v3 [cs.CV] Aug. 16, 2019 (41 pages).
Frank, et al, "Leveraging Frequency Analysis for Deep Fake Image Recognition", In Proc. ICML., pp. 3247-3258, PMLR arXiv preprint: arXiv:2003.08685v3 [cs.CV] Jun. 26, 2020, (17 pages).
Ding, et al, "Does a GAN leave distinct model-specific fingerprints?", Proc. BMVC (2021), 13 pages.
Yu, et al, "Artificial Fingerprinting for Generative Models: Rooting Deepfake Attribution in Training Data", In Proc. ICCV, pp. 14448-14457 (2021).
Yu, et al, "Responsible Disclosure of Generative Models using Scalable Fingerprinting", arXiv preprint: arXiv:2012.08726v5 [cs. CR] Mar. 17, 2022, 16 pages.
Ruta, et al, "ALADIN: All Layer Adaptive Instance Normalization for Fine-grained Style Similarity", In Intl. Conf. Computer Vision (ICCV), arXiv preprint: arXiv: 2103.09776v1 [cs.CV] Mar. 17, 2021, 10 pages.

* cited by examiner

Figure 4:
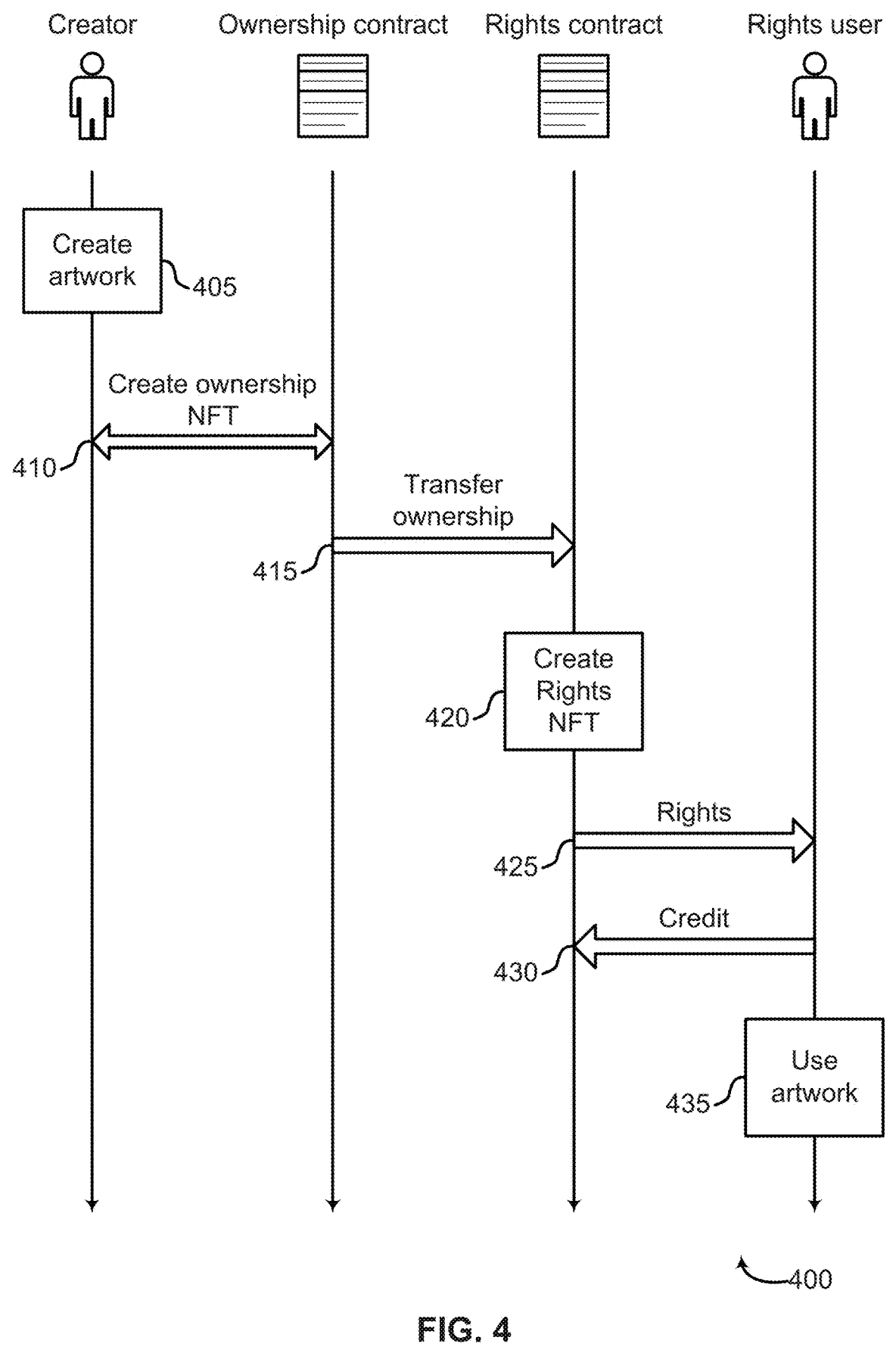

Creator       Ownership contract       Rights contract       Rights user

Create
artwork ⟵ 405

Create ownership
NFT

410 ⟵

Transfer
ownership

415 ⟵

Create
Rights
NFT

420 ⟵

Rights

425 ⟵

Credit

430 ⟵

Use
artwork

Receive input data including an ownership token identifier for an ownership token ⌐705

Obtain an indication of usage rights for the creative work corresponding to the ownership token from an owner of the creative work ⌐710

Mint a rights token corresponding to the ownership token ⌐715

Receive a rights token including a reference to a description of usage rights for a creative work

805

Exercise the usage rights for the creative work

810

Determine a credit for exercising the usage rights via the rights token

815

DECENTRALIZED PLATFORM FOR ARTIFICIAL INTELLIGENCE DATA PROVENANCE AND COMMODIFICATION

BACKGROUND

The following relates generally to decentralized technologies, and more specifically to managing rights for creative work using non-fungible tokens (NFTs) stored on a blockchain.

A blockchain is a decentralized, distributed database used to record transactions securely and transparently. A blockchain is a type of decentralized technology or distributed ledger technology (DLT) which may be used in a wide range of applications. Blockchain technology may allow for the creation of digital currencies and may have additional applications such as smart contracts and decentralized applications. A smart contract refers to a program or software object (e.g., in an object-oriented sense) deployed on a distributed ledger. A blockchain may maintain a list of ordered records called blocks, where each block contains a batch of transactions and a reference (e.g., a hash) of a previous block in the blockchain. A blockchain transaction refers to a transfer of value on a blockchain (e.g., such as for digital currency exchanges) or a change of a state of a blockchain (e.g., based on an execution of a smart contract).

SUMMARY

The present disclosure describes systems and methods for managing rights for creative work (e.g., images, music, etc.). Embodiments of the present disclosure include a rights management apparatus configured to issue and track the rights of consumers to use creative work, including compensating creators when the consumers exercise those rights. A distributed virtual machine may manage an ownership contract for the creative work and a rights contract for a creator. The ownership contract may mint an ownership token that indicates ownership of the creative work. Ownership of the ownership token may then be transferred to the rights contract. Once the rights contract is assigned ownership of the ownership token, the rights contract may issue and track rights to use the creative work. For instance, the rights contract may mint a rights token for the creative work and may transfer the rights token to a rights holder. The rights token may include a reference to a description of usage rights for the creative work. The rights holder may then use the creative work in accordance with the usage rights, and the creator may be compensated for their creative work accordingly.

A method, apparatus, non-transitory computer readable medium, and system for managing rights for creative work are described. One or more aspects of the method, apparatus, non-transitory computer readable medium, and system include receiving, at a rights contract on a distributed virtual machine operated based on a public blockchain, input data including an ownership token identifier for an ownership token, wherein the ownership token indicates ownership of a creative work, obtaining, at the rights contract, an indication of usage rights for the creative work corresponding to the ownership token, and minting, via the rights contract, a rights token corresponding to the ownership token, wherein the rights token includes a reference to the indication of the usage rights for the creative work.

An apparatus, system, and method for managing rights for creative work are described. One or more aspects of the apparatus, system, and method include at least one memory component and at least one processing device coupled to the at least one memory component. The processing device may be configured to execute instructions stored in the at least one memory component to perform operations including: receiving a rights token including a reference to a description of usage rights for a creative work; exercising the usage rights for the creative work; and determining a credit for exercising the usage rights via the rights token.

BRIEF DESCRIPTION OF THE DRAWINGS

FIG. 4 shows an example of a process for managing rights for creative work according to aspects of the present disclosure.

DETAILED DESCRIPTION

Figure 1:
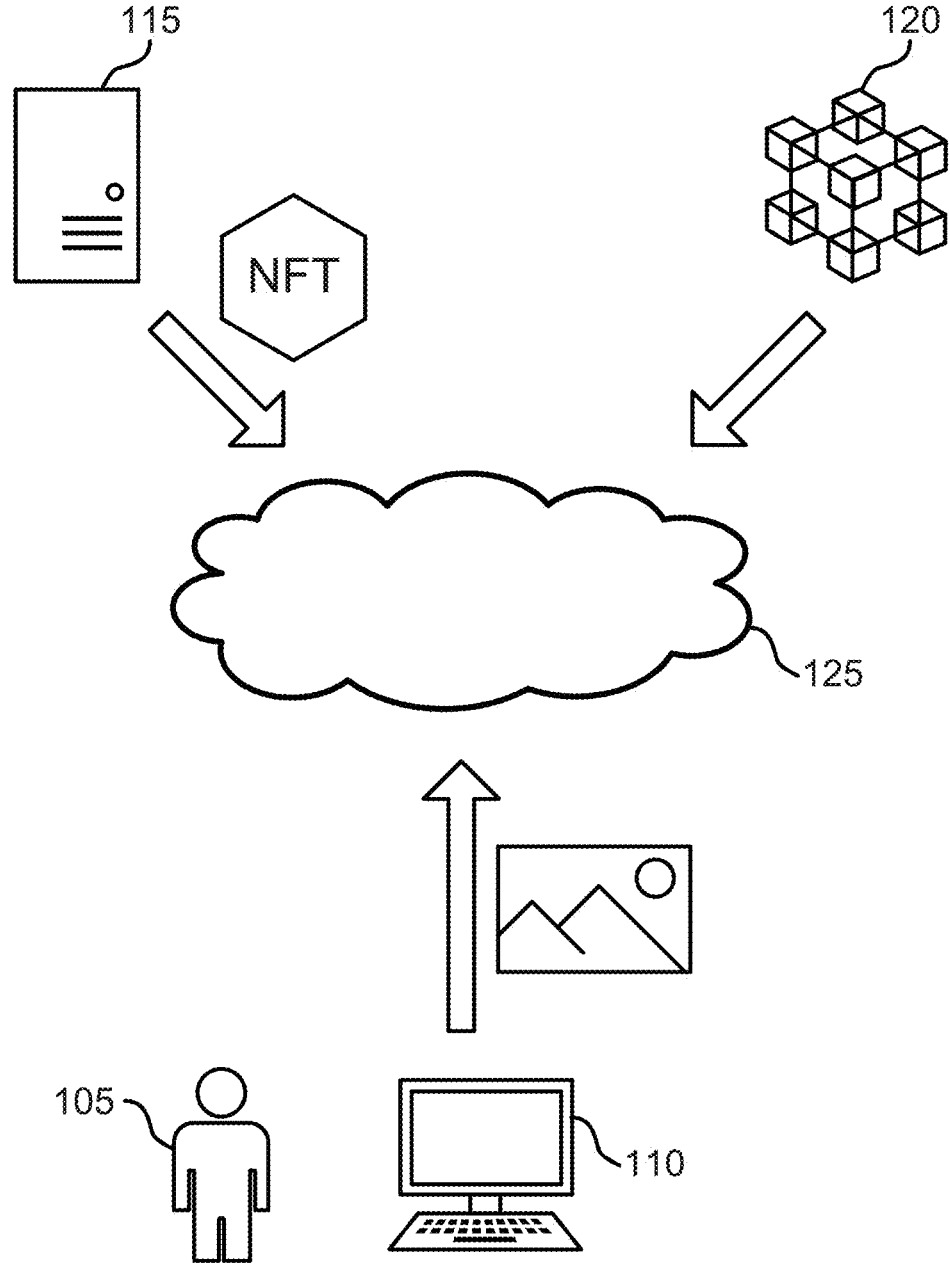
FIG. 1 shows an example of a rights management system according to aspects of the present disclosure.

The present disclosure describes systems and methods for managing rights for creative work (e.g., images, music, etc.). Embodiments of the present disclosure include a rights management apparatus configured to issue and track the rights of consumers to use creative work, including compensating creators when the consumers exercise those rights. A distributed virtual machine may manage an ownership contract for creative work and a rights contract for a creator. The ownership contract may mint an ownership token that indicates ownership of the creative work. Ownership of the ownership token may then be transferred to the rights contract. Once the rights contract is assigned ownership of the ownership token, the rights contract may issue and track rights to use the creative work. For instance, the rights contract may mint a rights token for the creative work and may transfer the rights token to a rights holder. The rights token may include a reference to a description of usage rights for the creative work. The rights holder may then use the creative work in accordance with the usage rights, and the creator may be compensated for their creative work accordingly.

As the amount of data generated and collected by individuals and organizations continues to increase, the importance of managing ownership of the data, rights to use the data, and the authenticity of the data also increases. As an example, artificial intelligence (AI) may be powered by, and may derive value from, huge volumes of data gathered from diverse sources. Governance of that data is a major challenge, including providing that the data is unbiased and is used with consent, privacy, and respect for intellectual property (IP). The ability to demonstrate the provenance and rights to use data for AI training and otherwise may underwrite the economic value and societal acceptance of AI.

Transformative shifts in public attitude to large-scale data sharing or use in AI present friction to data availability for AI. Organizational solutions to data governance may have failed to restore public confidence. Limitations in data infrastructure contrast the exponential growth of data needs for AI, presenting a barrier to innovation in AI. Within the creative sector, it is increasingly difficult to obtain large volumes of data to train AI (e.g., with suitable permissions). Yet, modern creative AI innovations such as DALL-E, Imagen, etc. may use hundreds of millions of images to train. Such AI innovations are already receiving negative public reaction as individuals raise concerns that their images or their creative style are being misappropriated by AI creators.

Solving data provenance may address one or more challenges for creative AI. Emerging open standards for securing data provenance (e.g., the content authenticity initiative (CAI)) may be used to trace the origins of media assets to improve creative attribution and counteract misinformation. At the same time, open and decentralized platforms for trading and collecting digital assets (e.g., such as non-fungible tokens (NFTs) on a Blockchain) offer a means to securely assert and transfer ownership of digital media assets. Embodiments of the present disclosure include technologies to create a data provenance and rights framework for creative work.

Some embodiments of the present disclosure may allow for better attribution to creators for creative work (e.g., images) used to train AI. Further, some embodiments may enable users to commodify their own creative work through a rights and royalties model that rewards contribution of media for use in AI training or any use of media through a combination of AI and Blockchain (e.g., NFT) technology. A rights management system supporting the rights and royalties model may be implemented to issue and track rights for using creative work. An ownership contract may create or mint an NFT identifying creative work owned by a creator. Ownership of the creative work may then be transferred to a rights contract owned by the creator, and the rights contract may create and issue rights for using the creative work to rights holders. As such, the rights holders may be able to determine or provide credits to the creator via the rights contract to use the creative work, and creators may be compensated via the rights contract for their creative work.

Compared to NFT technologies that consider the ownership provenance of an asset, the proposed rights management system (e.g., including an ownership, rights, and authenticity (ORA) triangle) may trace the creation provenance of an asset as well as the issuing and tracking of rights to use the asset. Some approaches to encoding rights for NFTs might involve signing or otherwise embedding license information into the metadata of the file. However, given the immutable nature of NFTs, such approaches may not support rights being created, bought, or sold after the creation of an asset. The described rights management system for managing rights for creative work may support a new market for the rights for using digital assets. Details regarding the architecture of an example rights management system are provided with reference to FIGS. 1-3. Details regarding processes for managing rights for creative work are provided with reference to FIGS. 4-9.

Network Architecture

FIG. 1 shows an example of a rights management system 100 according to aspects of the present disclosure. The rights management system 100 includes a creator 105, a computing device 110, a rights management apparatus 115, a blockchain 120, and a cloud 125.

The creator 105 may be the owner of some creative work (e.g., artwork, literature, etc.) and may interact with software on computing device 110 to upload the creative work to a rights management apparatus 115 (e.g., a server). In some examples, the rights management apparatus 115 may be located on the cloud 125. The rights management apparatus 115 may identify the creative work, create (e.g., mint) an ownership token that uniquely identifies the creative work, and record the creation of the ownership token on the blockchain 120. The rights management apparatus 115 may also issue and track the rights of consumers to use the creative work, such that the creator 105 may be compensated or credited for their creative work when those rights are exercised.

In some examples, the rights management apparatus 115 may include a server. A server provides one or more functions to creators 105 linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device 110, a personal computer, a laptop computer, a mainframe computer, a super computer, or any other suitable processing apparatus.

A blockchain (e.g., the blockchain 120) is a decentralized, distributed database used to record transactions securely and transparently. A blockchain is a type of decentralized technology or distributed ledger technology (DLT) which may be used in a wide range of applications. Blockchain technology may allow for the creation of digital currencies, as well as other applications such as smart contracts and decentralized applications. A smart contract may be a kind of program or object (e.g., in an object-oriented sense) deployed on a DLT. A blockchain may maintain a list of ordered records called blocks, where each block contains a batch of transactions and a reference (e.g., a hash) of a previous block in the blockchain. A transaction may refer to a transfer of value on a blockchain (e.g., such as for digital currency exchanges), or a transaction may refer to change of a state of a blockchain (e.g., based on an execution of a smart contract).

In some examples, blockchain technologies may be used for digital asset management. In such examples, NFTs used to uniquely identify digital assets may be minted and stored on a blockchain. NFTs may refer to tokens that represent digital artworks on a DLT. In some examples, NFTs may be implemented via smart contracts. In addition, NFTs may implement a specific interface and behavior, such as the interface and behavior described in the ERC-721 standard. An ERC-721 contract may implement a mint method to create a new token and a transfer method to transfer ownership of the token to someone else. An NFT smart contract may track the ownership of tokens (e.g., artworks) in a key value store. The key may be the unique identifier of the artwork (unique to that contract) and is usually an integer, and the value may be a wallet address corresponding to the individual that owns that token.

A set of artworks may be called an NFT collection, and a contract may manage all NFTs in that collection. An NFT contract may not store the artwork itself, but may store a uniform resource locator (URL) pointing to the artwork. In some examples, a further key value store may map an NFT identifier to the URL. The URL may point to an asset in a distributed storage platform (e.g., an interplanetary file system (IPFS)) where filenames are equivalent to the hash of the file contents, thus making the asset immutable. For instance, the URL, by convention, may point to a JavaScript object notation (JSON) file containing metadata (e.g., a title) relating to the asset, as well as an immutable URL again via a distributed storage platform to the media asset itself.

Some NFT marketplaces offer a window onto the public DLT to trade NFT assets. These marketplaces may wrap an NFT smart contract with another contract to mediate credit. The wrapping may involve assigning ownership (e.g., transferring via a transfer method) of the NFT to the marketplace's smart contract. Smart contracts also have wallet addresses and may own tokens like NFTs and cryptocurrencies. The business logic of the marketplace's smart contract may ensure that a credit is received into the market smart contract prior to calling the transfer method to transfer the NFT to the new owner. The business logic of the marketplace's smart contract may also mediate the credit to the seller, usually taking a commission on the sale and retaining some of the cryptocurrency in the market's smart contract.

Some marketplaces may implement a way to continually take a commission each time the NFT is sold. These marketplaces may mint an NFTs using a special NFT contract, implemented by the marketplace, that contains the business logic to make such credits whenever the transfer method is called. The ability to make ongoing commissions or royalties on sales may be limited to the marketplace the NFT was minted on. If the NFT is sold on another marketplace that implements the functionality differently, the ability to earn royalties on downstream sales may be lost.

Thus, NFT technology may be limited to tracking the ownership of a digital asset and may not consider rights or licensing. The functionality of royalty-earning schemes may be limited to within-market sales, which may not allow for decentralized markets for content enabled via NFTs. Instead, specific centralized markets may be relied upon to transact NFTs with royalties. Moreover, royalties may be earned when NFTs are resold (e.g., ownership is transferred), and there may not be a framework to express different kinds of royalties that may be paid for different kinds of uses of an asset.

Authentication of content may be performed based on a standardized specification such as The Coalition for Content Provenance and Authenticity (C2PA). C2PA promotes communication of media provenance information to downstream consumers of the media (e.g., describing how a media item was captured and what has been done to it). This is achieved by embedding a data packet called a manifest within the metadata of the media asset. The manifest encodes a cryptographically signed graph structure of provenance records, called claims, that describe the capture and manipulation of the content. In the event that the manifest is stripped away from the media asset (e.g., due to non-compliant toolchains or attacks), it may be recovered using a robust search and recovery technology that looks up the manifest in a trusted database using a content fingerprint (e.g., perceptual hash computed from the media content, such as the pixels themselves). The manifest may also be linked by embedding a watermark in the asset.

C2PA has been used in conjunction with NFT technology to guard against theft of media assets on NFT marketplaces. Such theft may also referred to as 'copy minting' where NFTs are copy-pasted and reminted to steal intellectual property. Within the secure C2PA metadata, the wallet address of the creator who wishes to mint the asset is stored. The signed asset is then minted. Marketplaces may issue a warning if the asset is minted by someone other than the original creator.

In some examples, there may not be a commonly agreed platform or standard to record (e.g., in metadata) the data used to train an AI model, nor the model used to generate an asset (e.g., a generated image). Rather, digital forensics may be used to detect and/or attribute images to the generative model (e.g., such as a generative adversarial network (GAN)) that created them. GAN fingerprinting is the natural extension of image or video fingerprinting (i.e., perceptual hashing to generative images). Most GAN fingerprinting works focus on facial images, seeking to identify the model or the architecture and meta parameters. All these works may be passive, and the practicality of GAN identification may be limited by reliance upon fragile signals within an image that may be easily destroyed by benign transformation.

GAN training may be modified to inject a robust fingerprint into a synthetic image. However, such approaches require active participation of the GAN creator, and all remain limited to images of a single semantic class. In security machine learning (ML) literature, membership inference attack (MIA) is studied to determine whether a piece of training data has been used to train an AI model. Similarly, property inference attack (PIA) has been studied to reveal the distribution (e.g., of demographics) used to train a model. These methods may not yet be applied to generative image AI to identify the data used to train that model (e.g., model-level data provenance). Further, there may not be attempts to attribute individual training data responsible for a particular generation of a model (e.g., how much a training data contributed to a specific image).

The rights management system 100 may support a rights and royalties model that rewards contribution of media for use in AI training or any use of media through a combination of AI and Blockchain (e.g., NFT) technology.

Figure 2:
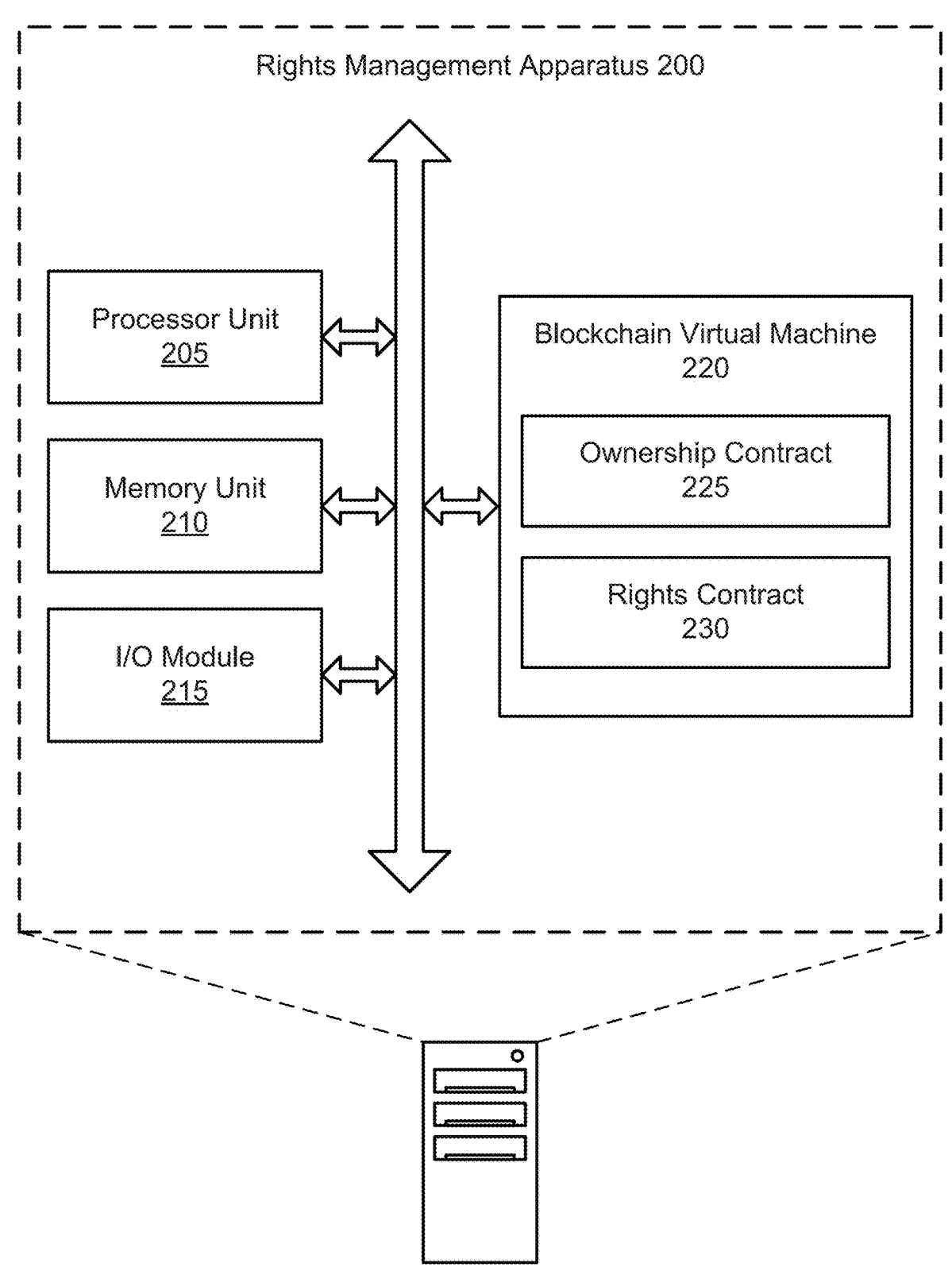
FIG. 2 shows an example of a rights management apparatus according to aspects of the present disclosure.

FIG. 2 shows an example of a rights management apparatus 200 according to aspects of the present disclosure. The rights management apparatus 200 includes a processor unit 205, a memory unit 210, an I/O module 215, and a blockchain virtual machine 220. The blockchain virtual machine 220 includes an ownership contract 225 and a rights contract 230, which may be an example of smart contracts described with reference to FIG. 1. The rights management apparatus 200 is an example of, or includes aspects of, the corresponding element described with reference to FIG. 1.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Memory unit 210 comprise a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

The blockchain virtual machine 220 may be designed to address one or more challenges with data provenance for creative work (e.g., creative work identified by an NFT). The one or more challenges include the limiting design of an NFT ecosystem that disadvantages creators and limits use cases for NFTs for creative work. The one or more challenges also include limited AI training practices that disincentivize contribution of creative work to large-scale AI training through a lack of data provenance and opportunity for commodification of creative work.

NFTs are immutable digital representations of creative works, such as images. DLTs or blockchain may be used to securely track the ownership of NFTs. Tokens representing creative works may be created (minted), bought or sold (transferred), or destroyed (burned) on DLT, much like cryptocurrency. In some examples, purchasers of NFTs may not convey any concrete rights (e.g., copyright or the right to make derivative works) to use purchased media. Rather, the DLT may track ownership of the NFT (e.g., a specific form of right such as the right to sell or dispose of the token). As such, the scope of NFTs to be used in creative works may be limited, and NFTs may instead be used as a vehicle for financial speculation. In addition, there may be other issues with NFTs, such as energy and transaction cost. The rights management apparatus 200 may address the absence of a rights landscape for NFTs by supporting a rights framework that can co-exist with existing NFTs. The rights framework may enable the extension of NFTs from consideration solely of ownership provenance to the provenance of any kind of right related to NFTs.

A unique aspect of NFTs is the ability for a creator to earn a royalty each time their work is resold, although this functionality may usually be provided through a marketplace that limits the royalty earning functionality to subsequent sales on their platform. The rights framework supported by the rights management apparatus 200 also addresses this challenge by considering the more general case, where royalties can be earned through exercising any kind of right to an NFT. For example, the right to use (e.g., play a piece of media) may be exercised by a rights holder (e.g., a streaming service) and may result in a microcredit being made to a creator (e.g., the artist). That right might also be transferable, and a royalty may be paid for that transaction. The rights management apparatus 200 may support the issuing of such rights to rights users and may facilitate the earning of such royalties by creators.

The rights management apparatus 200 may apply emerging data provenance standards (e.g., C2PA) to track the contributions of media used to train creative AI models. This may enable data contributors to be compensated for their contributions to the AI model through royalty credits. In one case, royalties may be paid at the time of training, and, in another case, royalties may be paid at the time of content generation (e.g., inference) from that AI model. In any case, the NFT logic around rights may be applied to make a credit to a creator. In the latter case of royalties being paid at inference time, AI techniques may be applied to deduce the contribution of training data to a given generation of the AI model in order to determine the value of the compensation. The rights management apparatus 200 may support a retrieval-based framework for calculating a reward given a generated image and training data.

The rights management apparatus 200 may support the issuing and tracking of rights to use creative assets such as images, including compensating creators for the exercising of those rights (e.g., making use of the asset for derivate work including the training of AI models). The rights management apparatus 200 may be decentralized, in that it may use tokenized representations of creative assets (e.g., NFTs) and tokenized representation of rights to those assets. The rights tokenization scheme supports the management of ownership, rights, and authenticity of creative work and may be referred to as ORA. NFT and ORA tokens may be issued and exchanged on a distributed ledger (e.g., blockchain) such that any open marketplace may be set up to invoke the creation and transfer of assets or rights to assets. This provides opportunities for creators to generate income from rights to their work via any marketplace. There may be one or more implementations of a market facilitating the management of rights and the compensation of creators when those rights are exercised.

In some examples, a rights management system supported by the rights management apparatus 200 may represent a way to track the provenance and rights to digital creative assets in future technologies (e.g., a metaverse including multiple disjoint platforms on which value is to be created from digital assets).

In one aspect, the rights management system may support the creation of a tokenized rights framework called ORA, to issue (e.g., through sale) rights to digital assets manifested as NFTs. This addresses a major limitation of NFTs, in that when assets are bought there may be no rights assigned to the purchaser (e.g., other than the right to resell). This enables purchased NFTs to be used by creative end users with confidence, and the creation of a market for content rights around NFTs may generate income for creators in the creator economy.

In another aspect, the rights management system may support the creation of a royalty mechanism to compensate creators for the sale of creative work or the exercising of ORA rights over the creative content. The royalty mechanism may enable content consumers to pre-purchase credit on a smart contract owned by the creator using cryptocurrency and spend that credit by exercising rights over content (e.g., using content to run AI models or play content via streaming services). The creator can withdraw sums of spent credit from the smart contract and may receive compensation for the use of their work. In some examples, the royalty mechanism may be discovered by an end user of a digital asset, enabling them to make an appropriate credit to use the digital asset.

In yet another aspect, the rights management system may support the use of emerging data provenance standards (e.g., C2PA) to track the use of digital assets, such as images, to train creative AI models such as generative models (e.g., GANs, diffusion models, etc.) that create synthetic images. When a model is run to create an image (e.g., inference is performed), provenance information may be used to identify which NFT, and thus which rights contract governs the use of that NFT. An appropriate rights contract may then be called upon by the rights management system to make a credit.

In yet another aspect, the rights management system may support the use of a retrieval (e.g., search) technology to optionally determine an apportionment of credit to creators who contributed their digital assets to the training of a generative AI model. For example, a style search may be used to determine the closest images stylistically that exist in the training set of the AI model—as identified through the provenance of that model. A credit made to creators may be weighted accordingly to compensate each creator (e.g., artist) for the use of their characteristic visual style. Without loss of generality, other kinds of matching may be alternatively performed, such as finding training images containing similar semantic content (e.g., to a synthetic image).

The rights management apparatus 200 may support a mechanism to trace the use of digital assets and compensate creators for that use. The mechanism may be different from digital rights management (DRM) since the mechanism may provide a framework for actors to identify how and where to make credit but may not provide a way to enforce credit or control access to digital assets.

According to some aspects, rights contract 230 receives, on a distributed virtual machine operated based on a public blockchain, input data including an ownership token identifier for an ownership token, where the ownership token indicates ownership of a creative work. In some examples, rights contract 230 obtains an indication of usage rights for the creative work corresponding to the ownership token. In some examples, rights contract 230 mints a rights token corresponding to the ownership token, where the rights token includes a reference to the indication of the usage rights for the creative work.

According to some aspects, rights management apparatus 200 signs the creative work with an authentication signature, where the rights token includes a reference to the authentication signature. In some examples, rights management apparatus 200 stores the creative work in a distributed file store, where the ownership token includes a URL for the creative work on the distributed file store.

According to some aspects, ownership contract 225 receives, on the distributed virtual machine, input data including a reference to the creative work. In some examples, ownership contract 225 mints the ownership token. In some examples, ownership contract 225 assigns, via the ownership contract 225, ownership of the ownership token to the rights contract 230.

In some examples, rights contract 230 receives ownership of the ownership token and a reference to an authentication signature of the creative work. In some examples, rights contract 230 registers the creative work with the rights contract 230, where the minting is based on the registration.

In some examples, rights contract 230 assigns ownership of the rights token to a rights holder address.

In some examples, rights contract 230 receives a command to execute a function corresponding to exercising the usage rights. In some examples, rights contract 230 updates a usage counter based on the command.

In some examples, rights contract 230 receives a credit corresponding to the usage rights based on the rights token.

In some examples, rights contract 230 transfers the credit to an owner of the creative work.

In some aspects, the ownership token and the rights token include NFTs.

In some examples, rights contract 230 receives additional input data including the ownership token identifier. In some examples, rights contract 230 mints an additional rights token corresponding to the ownership token, where the additional rights token includes the reference to the description of the usage rights.

In some examples, rights contract 230 receives additional input data including the ownership token identifier. In some examples, rights contract 230 mints an additional rights token corresponding to the ownership token, where the additional rights token includes an additional reference to an additional description of additional usage rights other than the usage rights.

In some examples, rights contract 230 identifies a set of contributors of the creative work. In some examples, rights contract 230 transfers a credit to each of the set of contributors.

According to some aspects, a rights user receives a rights token including a reference to a description of usage rights for a creative work. In some examples, the rights user exercises the usage rights for the creative work. In some examples, the rights user determines a credit for exercising the usage rights via the rights token. In some examples, the rights user obtains a set of rights tokens corresponding to a set of creative works. In some examples, the rights user generates an additional creative work based on the set of creative works. In some examples, the rights user determines credits for a set of owners corresponding to the set of creative works based on the set of rights tokens.

Figure 3:
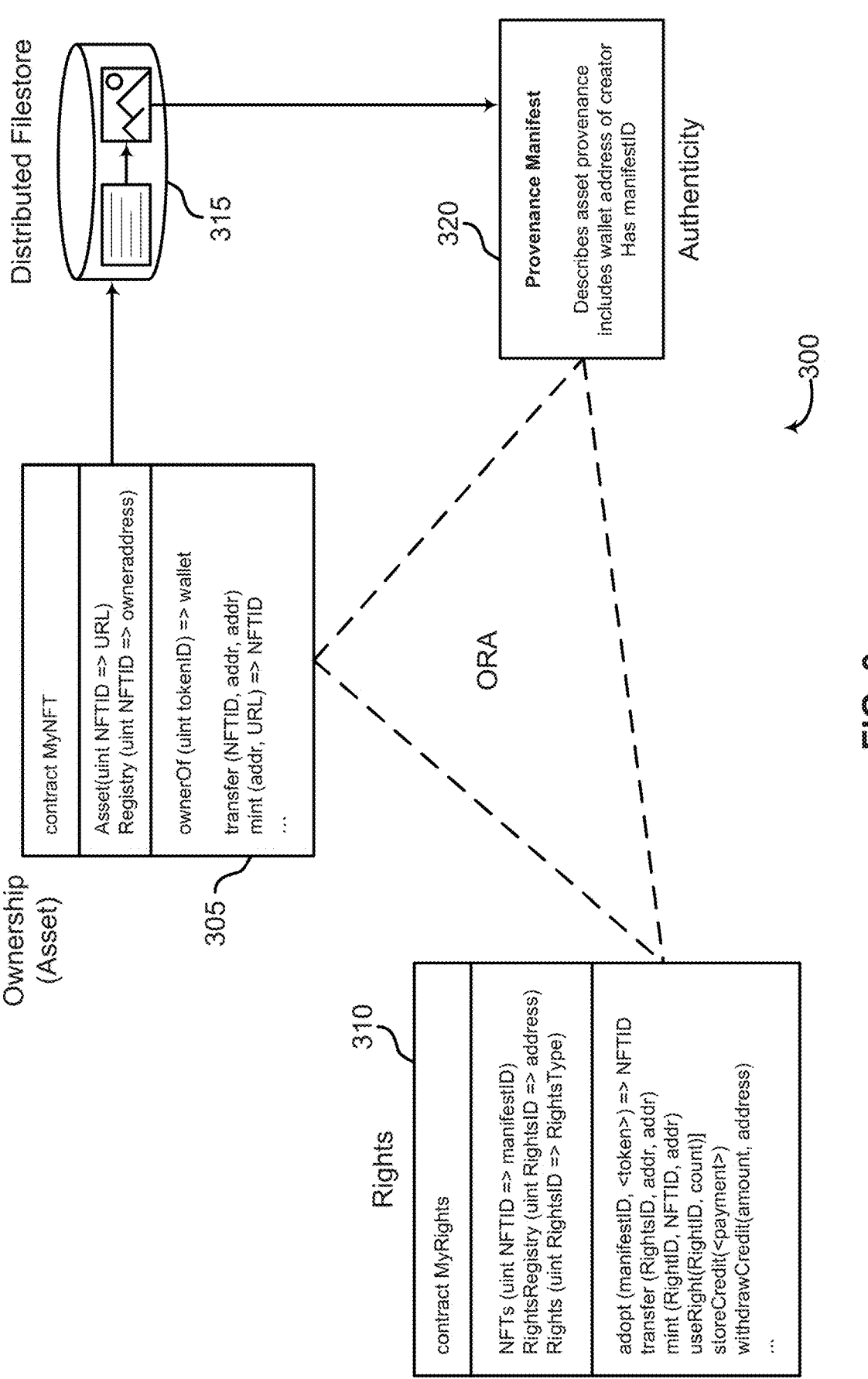
FIG. 3 shows an example of a rights management model according to aspects of the present disclosure.

FIG. 3 shows an example of a rights management model 300 according to aspects of the present disclosure. The rights management model 300 may tie together an NFT asset and its corresponding ownership provenance (e.g., who owned it), its creation provenance (e.g., how it was created, what was done to it, i.e., its authenticity), and rights that may be granted by a creator to rights holders. The rights management model 300 introduces a tokenized representation of rights to an NFT ecosystem, in a way that is backward compatible with existing NFTs and NFT markets. The rights management model 300 also provides a way to compensate creators for content used by consumers exercising those rights (e.g., running inference on an AI model trained using those images). Further, the rights management model 300 provides an optional way to consider apportionment of compensation based on how similar those training images are to the generated image (e.g., using some retrieval framework, like a style-based visual search).

An NFT may represent a concept of ownership with a weak connection to an asset that is owned. There are countless examples of fraudulent sales, malicious 'copy-minting,' and even outright theft leveraging this vulnerability. The rights management model 300 illustrates a conceptual triangle with three points joined by meaningful and immutable connections. The points in the triangle are ownership, rights, and authenticity. Ownership may be represented by the notion of an NFT on a blockchain. Ownership may be immutable, permanent, and its history may be tracked by the ownership provenance of the NFT. Rights may convey information about how an asset is to be used, by whom, for how long, and perhaps in what geographical metaverse scope. Authenticity may express an immutable connection to an underlying asset and its provenance history of creation, modification, and remixing.

In some examples, an NFT is owned directly by an NFT holder (e.g., the wallet address of the owner may be recorded in the key-value store for a given NFT ID). For instance, when a creator mints an NFT, the NFT is assigned to the creator. The NFT may be minted after embedding a manifest 320 within the asset (e.g., an image) before the minting process. In the example of FIG. 3, a creator may also mint, via an ownership contract 305, an NFT which is assigned to the creator. However, the creator may then transfer ownership of the NFT to a rights contract 310 (e.g., an ORA rights contract). A rights contract 310 may exist for each creator. For example, a creator may deploy a single rights contract 310 for all of their content, and the creator may transfer all of their NFTs to a wallet address of the rights contract 310 (e.g., the destination wallet may be the wallet address of the rights contract).

An asset may be authenticated (e.g., signed via C2PA), and a manifest ID may be passed to the rights contract 310, thus immutably tying the asset to the rights contract 310 (e.g., the rights issuing contract). The immutable tie between the asset and the rights contract 310 may allow for the asset to be immutable (e.g., stored in distributed file storage 315) or mutable. For instance, it may not be guaranteed that an immutable storage medium may be used for the NFT, and the immutable tie between the asset and the rights contract may guard against switching out the asset once rights have been granted.

A rights contract 310 may be written to the ERC-721 standard (e.g., with minting and transfer methods, among others), with some additional methods related to rights and royalty credits. A creator may mint rights to an asset, as a separate step after minting of the NFT (and transfer to the rights contract 310) is performed. As such, rights may be issued (e.g., minted and transferred to third party rights holders) for the use of an asset in a decoupled way (e.g., even some considerable time after minting).

One example of a process for creating an NFT based on an asset and managing the rights to use the asset is described. If an asset (e.g., creative work) does not already include a manifest 320 describing its provenance (e.g., a C2PA manifest), the asset may be injected with a manifest 320. An assertion is added into the manifest 320 documenting the blockchain address from which the asset may be minted. The asset may be stored in distributed file storage 315 along with JSON metadata, and the asset may be minted to create an NFT. Ownership of the asset may be transferred to the rights contract 310 operated by the creator, and the asset may be adopted by the rights contract 310 (e.g., by calling an adopt method with the manifest ID of the manifest 320 embedded in the asset).

At this point in the process, the asset may have been created (e.g., an NFT that identifies the asset may be created) and rights to use the asset may be granted. The creator of the asset may invoke the mint method on their rights contract 310 to create one or more transferrable rights tokens. These tokens may represent any kind of right. In some examples, the kinds of rights may be enumerated in a key-value store, with a rights kind integer as the key, and the value being a text-based license agreement or a description of the right. The creator may then set a price for exercising each created right. The rights tokens may be bought or sold to rightsholders via standard NFT processes (e.g., via a ERC-721 compliant marketplace). In some examples, any commission model or logic for the sales of these rights may be implemented by a marketplace.

The rights management model 300 (e.g., ORA framework) may supplement existing frameworks and may be backward compatible with existing NFT markets (e.g., the rights tokens may be an extension and may not break backward compatibility). The rights management model 300 may also not only record rights, but allow for commodification of those rights via a royalty credit system managed by a rights contract 310. The rights management model 300 may also be scalable since a single rights contract may be used per creator, rather than per asset or asset collection. In some cases (e.g., a future metaverse), where multiple independent platforms may exist to create value through digital assets, it may be appropriate for both provenance of digital assets and the rights of use of those digital assets to be encoded and exercised in a machine-readable way. The rights management model 300 may provide the foundation in such cases.

As generative AI models are rapidly adopted, there may be resistance from creators (e.g., creatives) on the use of their assets to train such models. As a result, creators may restrict or become reluctant to share their data, at a time when AI model training needs may be growing exponentially. The rights management model 300 may enable creators to be compensated for their contribution to training AI models, through microcredits made when such AI models are used. Credits may be a standard constant amount or apportioned according to the influence of the training data to a given generated image. The rights management model 300 may therefore improve fairness and improve the agency for creators with the use of their assets for AI. The rights management model 300 may also encourage the contribution of those assets to enable improved AI models trained on larger volumes of data.

Rights Management Processes

In FIGS. 4-9, a method, apparatus, non-transitory computer readable medium, and system for managing rights for creative work are described. One or more aspects of the method, apparatus, and non-transitory computer readable medium include receiving, at a rights contract on a distributed virtual machine operated based on a public blockchain, input data including an ownership token identifier for an ownership token, wherein the ownership token indicates ownership of a creative work, obtaining, at the rights contract, an indication of usage rights for the creative work corresponding to the ownership token, and minting, via the rights contract, a rights token corresponding to the ownership token, wherein the rights token includes a reference to the indication of the usage rights for the creative work.

Some examples of the method, apparatus, non-transitory computer readable medium, and system further include signing the creative work with an authentication signature, wherein the rights token includes a reference to the authentication signature.

Some examples of the method, apparatus, non-transitory computer readable medium, and system further include storing the creative work in a distributed file store, wherein the ownership token includes a URL for the creative work on the distributed file store.

Some examples of the method, apparatus, non-transitory computer readable medium, and system further include receiving, at an ownership contract on the distributed virtual machine, input data including a reference to the creative work. Some examples further include minting, by the ownership contract, the ownership token.

Some examples of the method, apparatus, non-transitory computer readable medium, and system further include assigning, via the ownership contract, ownership of the ownership token to the rights contract.

Some examples of the method, apparatus, non-transitory computer readable medium, and system further include receiving, at the rights contract, ownership of the ownership token and a reference to an authentication signature of the creative work. Some examples further include registering the creative work with the rights contract, wherein the minting is based on the registration.

Some examples of the method, apparatus, non-transitory computer readable medium, and system further include assigning, via the rights contract, ownership of the rights token to a rights holder address.

Some examples of the method, apparatus, non-transitory computer readable medium, and system further include receiving, at the rights contract, a command to execute a function corresponding to exercising the usage rights. Some examples further include updating, by the rights contract, a usage counter based on the command.

Some examples of the method, apparatus, non-transitory computer readable medium, and system further include receiving, at the rights contract, a credit corresponding to the usage rights based on the rights token.

Some examples of the method, apparatus, non-transitory computer readable medium, and system further include transferring, from the rights contract, the credit to an owner of the creative work.

In some aspects, the ownership token and the rights token comprise NFTs.

Some examples of the method, apparatus, non-transitory computer readable medium, and system further include receiving, at the rights contract, additional input data including the ownership token identifier. Some examples further include minting, via the rights contract, an additional rights token corresponding to the ownership token, wherein the additional rights token includes the reference to the description of the usage rights.

Some examples of the method, apparatus, non-transitory computer readable medium, and system further include receiving, at the rights contract, additional input data including the ownership token identifier. Some examples further include minting, via the rights contract, an additional rights token corresponding to the ownership token, wherein the additional rights token includes an additional reference to an additional description of additional usage rights other than the usage rights.

Some examples of the method, apparatus, non-transitory computer readable medium, and system further include identifying, by the rights contract, a plurality of contributors of the creative work. Some examples further include transferring, by the rights contract, a credit to each of the plurality of contributors.

In some aspects, an apparatus, system, and method for managing rights for creative work are described. One or more aspects of the apparatus, system, and method include at least one memory component and at least one processing device coupled to the at least one memory component. The processing device may be configured to execute instructions stored in the at least one memory component to perform operations including: receiving a rights token including a reference to a description of usage rights for a creative work; exercising the usage rights for the creative work; and determining a credit for exercising the usage rights via the rights token.

In some examples, the at least one processing device is configured to execute instructions stored in the at least one memory component to perform operations including: obtaining a plurality of rights tokens corresponding to a plurality of creative works; generating an additional creative work based on the plurality of creative works; and determining credits for a plurality of owners corresponding to the plurality of creative works based on the plurality of rights tokens.

FIG. 4 shows an example of a process 400 for managing rights for creative work according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, a creator may create artwork or some other creative work, such as an image, literature, music, or other content. In some cases, the operations of this step refer to, or may be performed by, a creator as described with reference to FIG. 1.

At operation 410, the creator may create, via an ownership contract, an ownership NFT that uniquely identifies the artwork created at operation 405. In some cases, the operations of this step refer to, or may be performed by, a creator as described with reference to FIG. 1 via an ownership contract as described with reference to FIG. 2. The creator may submit a transaction using a computing device to trigger the ownership contract to generate the ownership NFT (e.g., using a mint function of the ownership contract).

At operation 415, the ownership contract may transfer ownership of the artwork corresponding to the ownership NFT to a rights contract. In some cases, the operations of this step refer to, or may be performed by, an ownership contract and a rights contract described with reference to FIG. 2. The creator may submit a transaction using a computing device to trigger the ownership contract to transfer ownership of the artwork to the rights contract and trigger the rights contract to adopt ownership of the artwork from the ownership contract. For instance, the transaction may trigger a call to a transfer function of the ownership contract and an adopt function of the rights contract.

At operation 420, the rights contract may create a rights NFT which may be issued to provide permission to a rights user to use the artwork. In some cases, the operations of this step refer to, or may be performed by, a rights contract described with reference to FIG. 2. The creator may submit a transaction using a computing device to trigger the rights contract to generate the rights NFT (e.g., using a mint function of the rights contract). In some examples, the transaction may provide one or more parameters that specify details or specific usage rights associated with the rights NFT.

At operation 425, the rights contract may issue the rights NFT to a rights user to track the usage of the artwork by the rights user. In some cases, the operations of this step refer to, or may be performed by, a rights contract described with reference to FIG. 2. The creator may submit a transaction using a computing device to trigger the rights contract to transfer the rights NFT to the rights user (e.g., using a transfer function of the rights contract).

At operation 430, the rights user may provide, via the rights contract, credit for exercising the rights according to the rights NFT. In some cases, the operations of this step refer to, or may be performed by, a rights user described with reference to FIG. 2. In some examples, the credit from the rights user may trigger the rights contract to store credit corresponding to the credit (e.g., using a store credit function of the rights contract). The rights contract may then deduct from the credit when the rights are exercised, and the creator may withdraw the credit from the rights contract (e.g., using a withdraw credit function of the rights contract) to receive compensation from the rights user.

At operation 435, the rights user may exercise the rights according to the rights NFT and may use the artwork. In some cases, the operations of this step refer to, or may be performed by, a rights user described with reference to FIG. 2.

Figure 5:
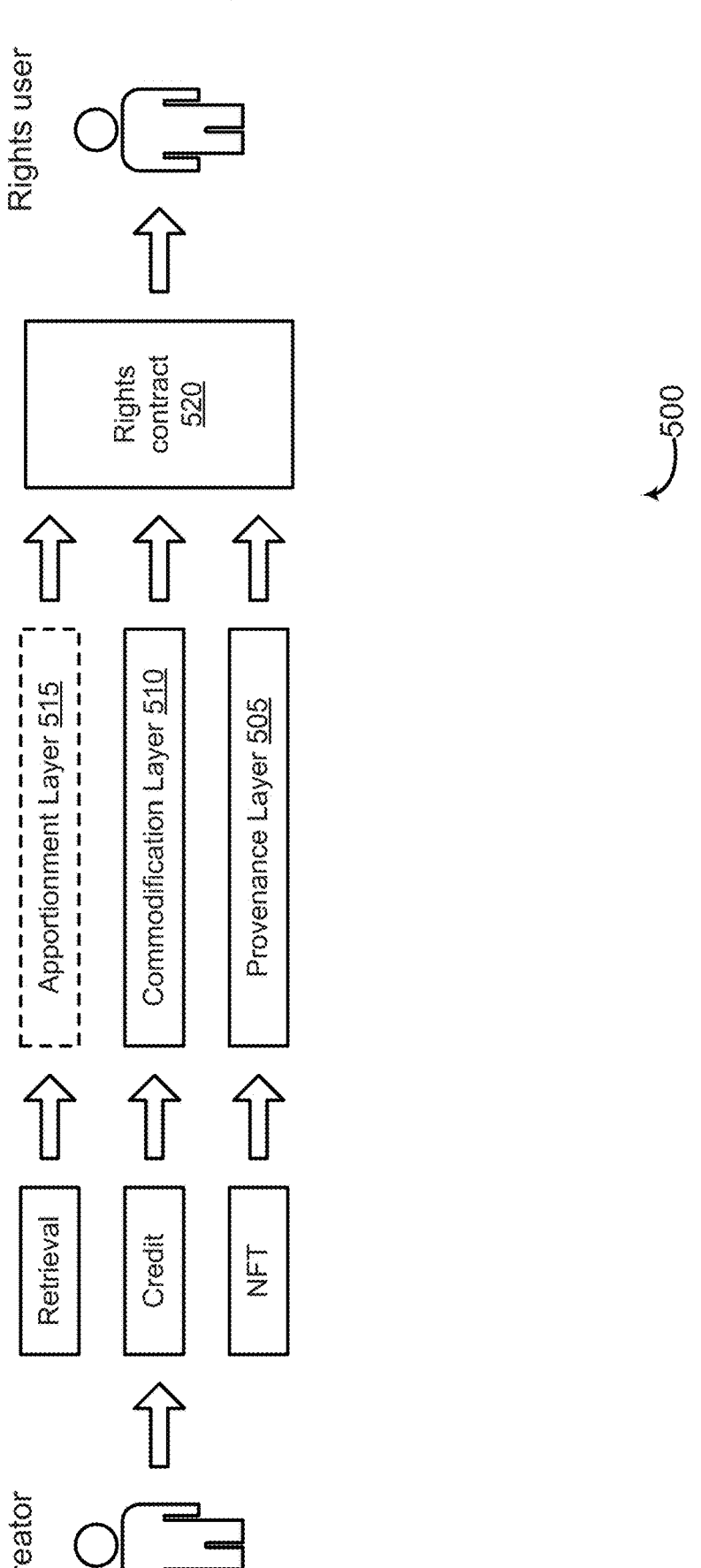
FIG. 5 shows an example of a content consumption process according to aspects of the present disclosure.

FIG. 5 shows an example of a content consumption process 500 (e.g., an ORA content consumption process) according to aspects of the present disclosure. The content consumption process 500 may allow for managing the rights of a user to use creative work such that a creator or owner of the creative work may be compensated appropriately when those rights are exercised. The content consumption process 500 may include three logic layers—a provenance layer 505, a commodification layer 510, and an apportionment layer 515. Provenance and rights may be traced at the provenance layer 505, credits may be made at the commodification layer 510, and credits may be optionally apportioned by some measure of importance at the apportionment layer 515.

A rights contract 520 may track the utilization of rights to an asset that have been transferred to rights holders. The rights contract 520 may also facilitate credits from rightsholders that wish to exercise those rights to creators of the asset. The use of an asset (e.g., by exercising one or more rights to consume the content) may be referred to as content consumption (e.g., playing out content, training an AI using the content, etc.). Content consumption may be addressed or managed via the three-layer model of the content consumption process 500.

In an example, consider an audio file that is an NFT in an ORA system, with tokenized rights to play out the content in return for royalty credits. This example may not consider an optional apportionment layer. When the content is played, the rights contract 520 managing that NFT is identified by checking which contract owns the NFT. For instance, an ownership contract for an NFT may check which rights contract 520 owns the NFT using an ownerOf method (e.g., on the ERC-729 NFT). The tracing of the provenance of the asset may be supported at a provenance layer 505.

The rights holder may verify that they hold the right to play out the content by interrogating the rights contract 520, and the rights holder may identify the price (e.g., royalty) for exercising the right to play out the content. To minimize microcredit overheads for exercising individual rights, a pre-credit system may be supported in which the rights contract 520 may be paid in advance for rights use in cryptocurrency. The rights contract 520 may call a storeCredit method which receives funds and stores the funds in the rights contract 520 (e.g., the creator's rights contract), and the rights contract 520 may update a credit balance for the wallet address of the rights holder from which the funds were received. The rights holder may then call upon a useRight method on the rights contract 520, which deducts the appropriate cryptocurrency credit from rights holder's internally tracked balance. The rights contract 520 may update a further balance for the creator that the creator may later and separately withdraw to their own wallet address. The receiving of credits and withdrawing of credits may be supported at the commodification layer 510.

In another example, consider an AI model that generates images (e.g., DALL-E) that is trained on many thousands of images (e.g., each image identified by an NFT in an ORA system). The AI model itself may be a derivative asset of those images (and, by extension, the NFTs in the ORA system). The AI model may therefore have a C2PA manifest describing the provenance of the model, listing out the thousands of images (e.g., or corresponding NFTs) used to train the AI model.

At inference time, the manifest for the model may be checked and the NFTs of the images used to train the AI model may be identified. The rights contract 520 for each of the images may be determined by tracing the ownership of the NFTs (e.g., since an NFT would be owned by a rights contract 520). Having established the provenance of each image, the relevant rights tokens for each NFT may be traced. For instance, an ownership contract for an NFT may check which rights contract 520 owns the NFT using an ownerOf method (e.g., on the ERC-729 NFT). The tracing of the provenance of images contributing to an AI model and the rights that may be held for those contributing images may be supported at the provenance layer 505.

A rights holder may then pay royalties to the contributors to an AI model by invoking the useRight method on the rights contract 520 (e.g., given that an appropriate credit balance is available on the rights contract being called). The credit of royalties to the contributors of the AI model may be supported at the commodification layer 510.

In some examples, it may be desirable to consider which training images contributed the most or had the most influence on a synthetic image generated by the AI model (e.g., since many thousands of images were likely used to train the AI model). There may be several ways to influence a synthetic image generated by the AI model (e.g., stylistically, semantically, etc.).

Figure 6:
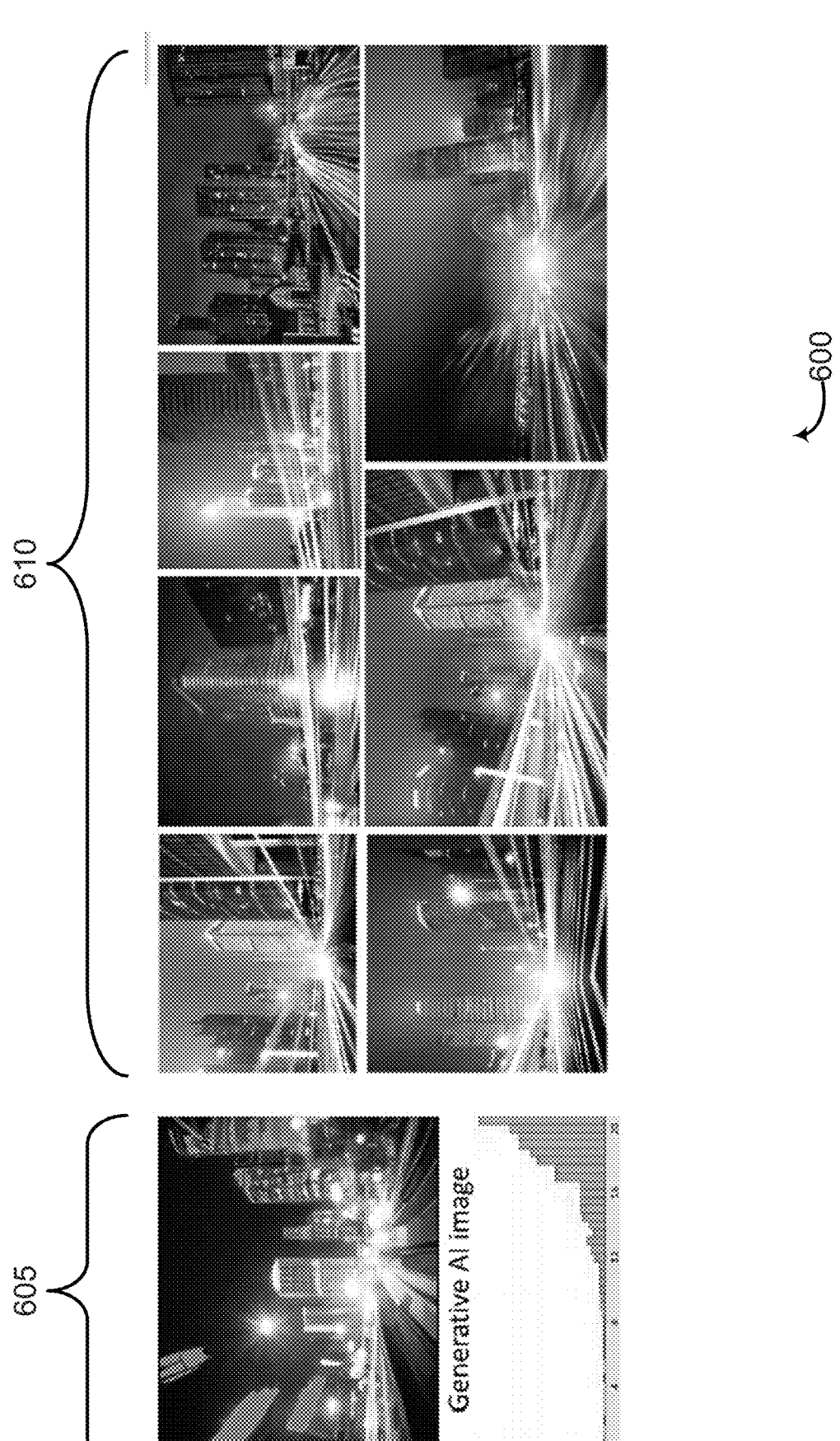
FIG. 6 shows an example of apportionment according to aspects of the present disclosure.

FIG. 6 shows an example of apportionment according to aspects of the present disclosure. In the example of FIG. 6, the stylistic influence of training images 610 on a generated image 605 is considered (e.g., since it is a common concern that AI generative models are encapsulating an artist's style). Using a style search algorithm, a style-based visual search may be run across training images used to train an AI model using a generated image 605 (e.g., synthetic image) as a query. A relevance score for the top 20 results may be normalized to create weights against each of the 20 images. Credit may then be scaled to the creators of one or more of the 20 images accordingly (e.g., based on a similarity score for the top k results). The scaling of credits to creators of one or more training images 610 (e.g., a training corpus) that contribute to the output of a model (e.g., the generated image 605) may be supported at an apportionment layer 515.

Figure 7:
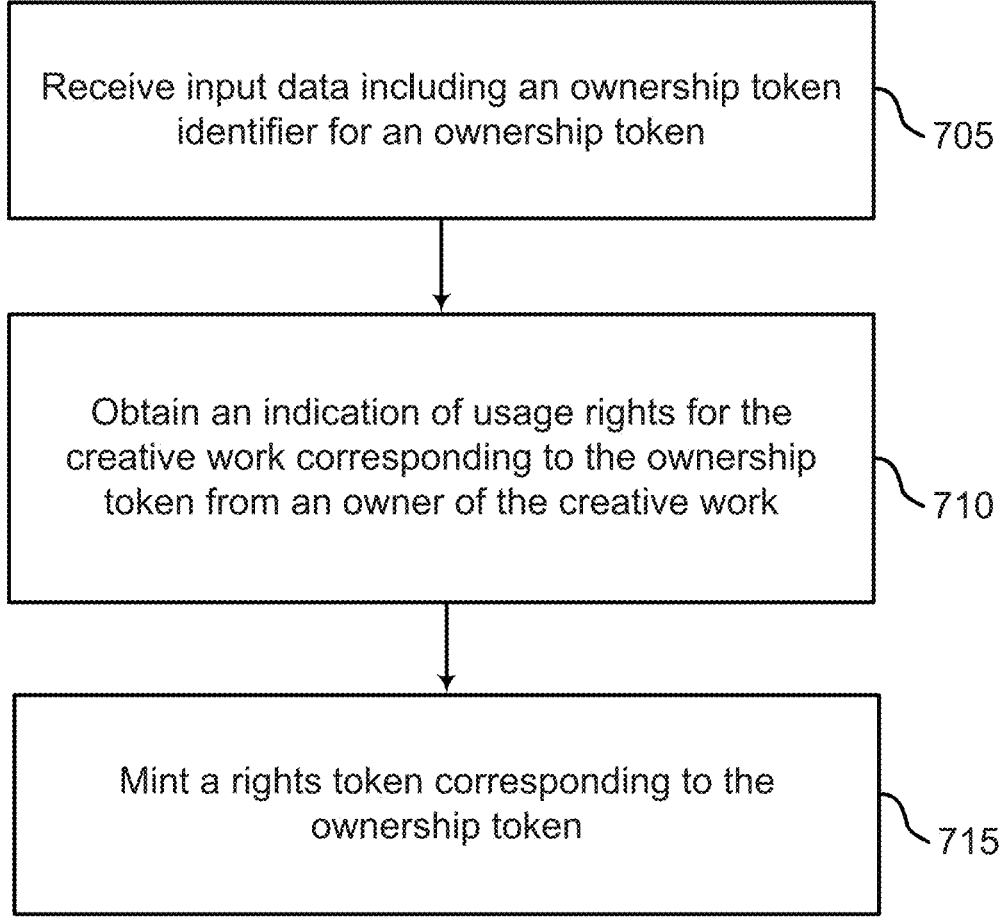
FIGS. 7 through 8 show examples of methods of managing rights for creative work according to aspects of the present disclosure.

FIG. 7 shows an example of a method 700 of managing rights for creative work according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives, at a rights contract on a distributed virtual machine operated based on a public blockchain, input data including an ownership token identifier for an ownership token, where the ownership token indicates ownership of a creative work. In some cases, the operations of this step refer to, or may be performed by, a rights contract as described with reference to FIG. 2.

At operation 710, the system obtains an indication of usage rights for the creative work corresponding to the ownership token. The indication of the usage rights can be received (either directly or indirectly) from the owner of the creative work (i.e., from a person authorized to provide the usage rights. In some cases, the owner may indicate the usage rights by using or activating a function of a smart contract on the blockchain. For example, the smart contract may have one or more predefined sets of rights available, and the owner could select a set of rights to associate with a new NFT by providing a signature to engage with the smart contract via one or more available methods of the smart contract.

At operation 715, the system mints, via the rights contract, a rights token corresponding to the ownership token, where the rights token includes a reference to the indication of usage rights for the creative work. In some cases, the operations of this step refer to, or may be performed by, a rights contract as described with reference to FIG. 2.

Figure 8:
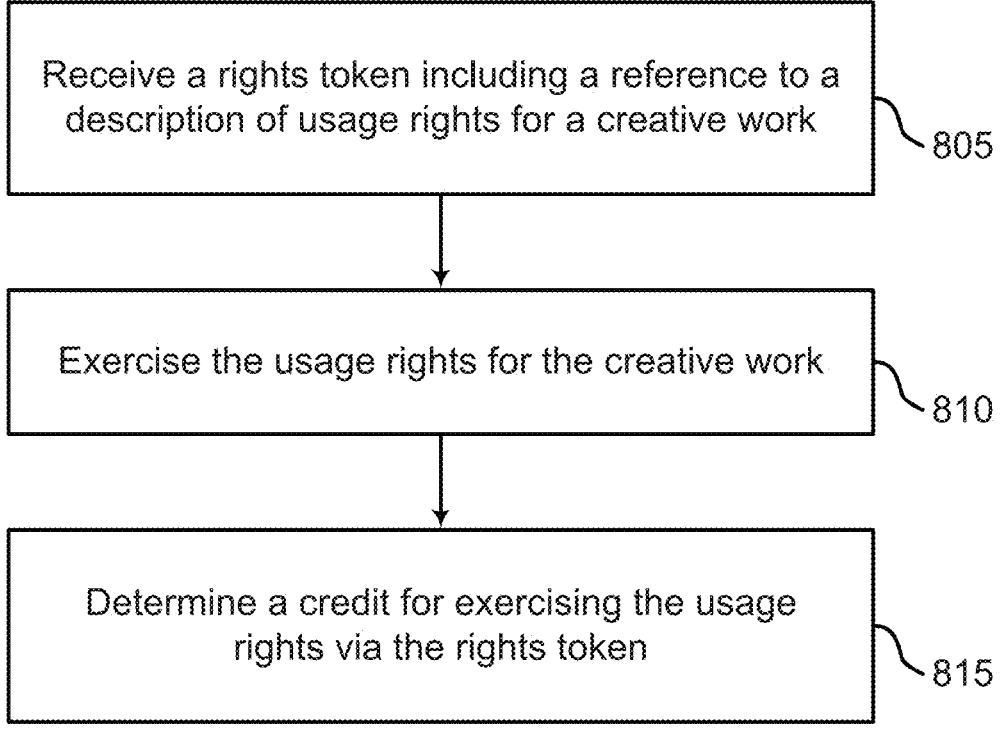

FIG. 8 shows an example of a method 800 of managing rights for creative work according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a rights token including a reference to a description of usage rights for a creative work. In some cases, the operations of this step refer to, or may be performed by, a user as described with reference to FIG. 1.

At operation 810, the system exercises the usage rights for the creative work. In some cases, the operations of this step refer to, or may be performed by, a user as described with reference to FIG. 1.

At operation 815, the system determines a credit for exercising the usage rights via the rights token. In some cases, the operations of this step refer to, or may be performed by, a user as described with reference to FIG. 1.

Figure 9:
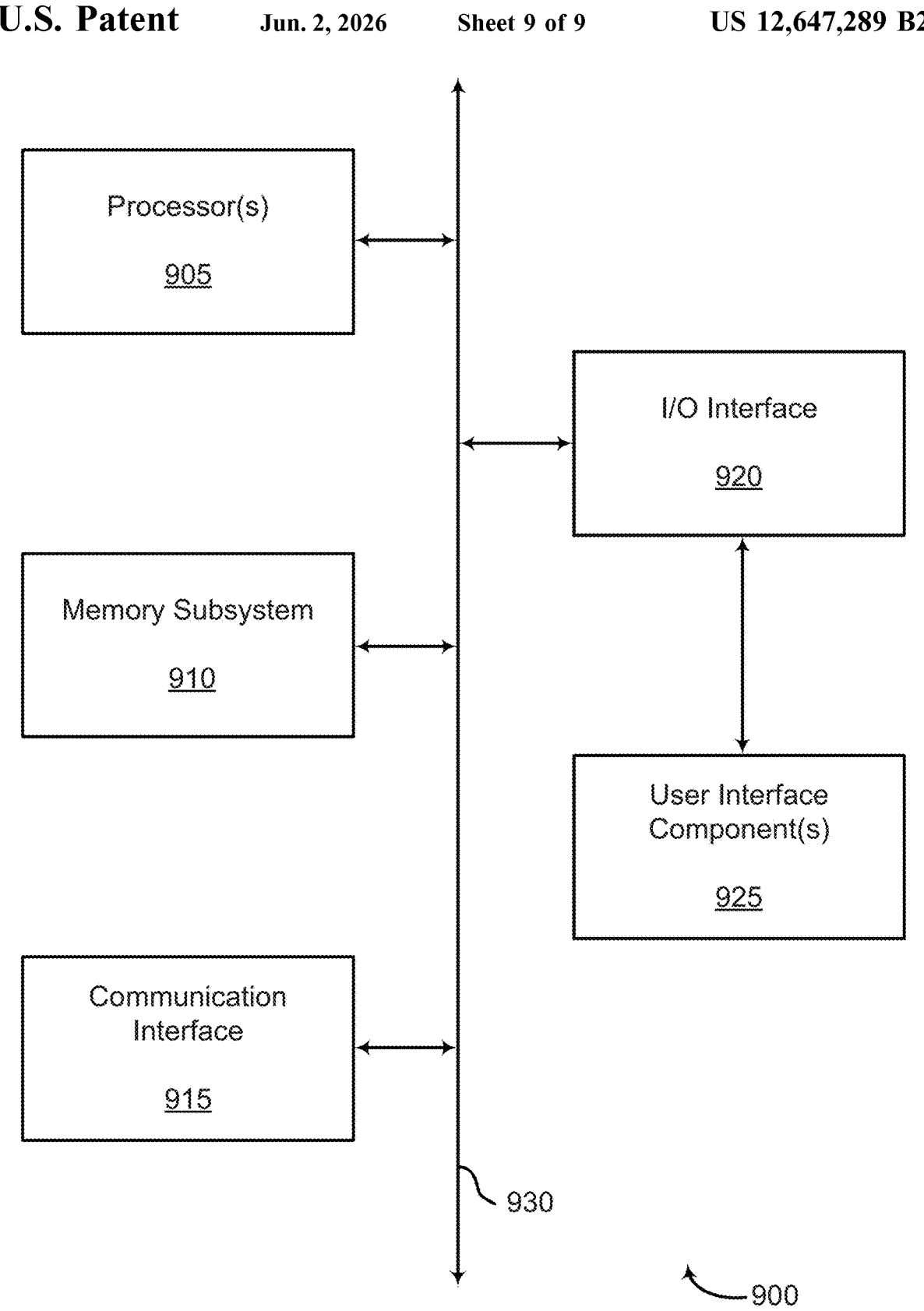
FIG. 9 shows an example of a computing device for managing rights for creative work according to aspects of the present disclosure.

FIG. 9 shows an example of a computing device for managing rights for creative work according to aspects of the present disclosure. In one aspect, computing device 900 includes processor(s) 905, memory subsystem 910, communication interface 915, I/O interface 920, user interface component(s) 925, and channel 930.

In some embodiments, computing device 900 is an example of, or includes aspects of, rights management apparatus 200 of FIG. 2. In some embodiments, computing device 900 includes one or more processors 905 that can execute instructions stored in memory subsystem 910 for receiving, at a rights contract on a distributed virtual machine operated based on a public blockchain, input data including an ownership token identifier for an ownership token, where the ownership token indicates ownership of a creative work; and minting, via the rights contract, a rights token corresponding to the ownership token, where the rights token includes a reference to a description of usage rights for the creative work that are held by an owner of the rights token.

According to some aspects, computing device 900 includes one or more processors 905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component(s) 925 enable a user to interact with computing device 900. In some cases, user interface component(s) 925 include an audio device, such as an external speaker system, an external display device such as a display screen, an input device (e.g., a remote-control device interfaced with a user interface directly or through the I/O controller), or a combination thereof. In some cases, user interface component(s) 925 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

executing, by a computer system operating as part of a distributed virtual machine operated based on a public blockchain, an ownership smart contract to mint an ownership token on the public blockchain, wherein the ownership smart contract complies with a non-fungible token standard, and wherein the ownership token comprises a non-fungible token based on the non-fungible token standard on the public blockchain that indicates an owner of a creative work;

executing, by the computer system operating as part of the distributed virtual machine, a function of the ownership smart contract in accordance with non-fungible token standard to assign ownership of the ownership token to a rights smart contract on the public blockchain by updating a key-value store of the ownership smart contract with an address of the rights smart contract in a block of the public blockchain;

receiving, at the computer system operating as part of the distributed virtual machine via a function activation of a smart contract on the blockchain, input data including an ownership token identifier for the ownership token and a rights token including an indication of usage rights for the creative work;

minting, via the computer system operating as part of the distributed virtual machine by executing a function of the rights smart contract in accordance with non-fungible token standard, a rights token for the creative work based on the input data and the ownership of the ownership token by the rights smart contract, wherein the rights token comprises another non-fungible token based on the non-fungible token standard of the public blockchain that indicates the usage rights for the creative work;

determining, via the computer system operating as part of the distributed virtual machine, a credit for exercising the usage rights via the rights token; and providing, via the computer system operating as part of the distributed virtual machine, the credit to the owner indicated by the ownership token for a use of the creative work based on the rights token by executing a function of the rights smart contract on the public blockchain.

2. The method of claim 1, further comprising:

signing the creative work with an authentication signature, wherein the rights token includes a reference to the authentication signature.

3. The method of claim 1, further comprising:

storing the creative work in a distributed file store, wherein the ownership token includes a Uniform Resource Locator (URL) for the creative work on the distributed file store.

4. The method of claim 1, further comprising:

receiving, at the ownership smart contract on the distributed virtual machine, input data including a reference to the creative work; and minting, by the ownership smart contract, the ownership token.

5. The method of claim 4, further comprising:

assigning, via the ownership smart contract, ownership of the ownership token to the rights smart contract.

6. The method of claim 1, further comprising:

receiving, at the rights smart contract, ownership of the ownership token and a reference to an authentication signature of the creative work; and registering the creative work with the rights smart contract, wherein the minting is based on the registration.

7. The method of claim 1, further comprising:

assigning, via the rights smart contract, ownership of the rights token to a rights holder address.

8. The method of claim 1, further comprising:

receiving, at the rights smart contract, a command to execute a function corresponding to exercising the usage rights; and updating, by the rights smart contract, a usage counter based on the command.

9. The method of claim 1, further comprising:

receiving, at the rights smart contract, a credit corresponding to the usage rights based on the rights token.

10. The method of claim 9, further comprising:

transferring, from the rights smart contract, the credit to an owner of the creative work.

11. The method of claim 1, wherein:

the ownership token and the rights token comprise non-fungible tokens (NFTs).

12. The method of claim 1, further comprising:

receiving, at the rights smart contract, additional input data including the ownership token identifier; and minting, via the rights smart contract, an additional rights token corresponding to the ownership token, wherein the additional rights token includes the reference to the description of the usage rights.

13. The method of claim 1, further comprising:

receiving, at the rights smart contract, additional input data including the ownership token identifier; and minting, via the rights smart contract, an additional rights token corresponding to the ownership token, wherein the additional rights token includes an additional reference to an additional description of additional usage rights other than the usage rights.

14. The method of claim 1, further comprising:

identifying, by the rights smart contract, a plurality of contributors of the creative work; and transferring, by the rights smart contract, a credit to each of the plurality of contributors.

15. A computer system operating as part of a distributed virtual machine operated based on a public blockchain comprising:

at least one memory component; and at least one processing device coupled to the at least one memory component, wherein the processing device is configured to execute instructions stored in the at least one memory component to perform operations comprising:

executing an ownership smart contract to mint an ownership token on the public blockchain, wherein the ownership smart contract complies with a non-fungible token standard, and wherein the ownership token comprises a non-fungible token based on the non-fungible token standard on the public blockchain that indicates an owner of a creative work;

executing a function of the ownership smart contract in accordance with non-fungible token standard to assign ownership of the ownership token to a rights smart contract on the public blockchain by updating a key-value store of the ownership smart contract with an address of the rights smart contract in a block of the public blockchain;

receiving, via a function activation of a smart contract on the blockchain, input data including an ownership token identifier for the ownership token and a rights token including a reference to a description of usage rights for the creative work;

minting, by executing a function of the rights smart contract in accordance with non-fungible token standard, a rights token for the creative work based on the input data and the ownership of the ownership token by the rights smart contract, wherein the rights token comprises another non-fungible token based on the non-fungible token standard of the public blockchain that indicates the usage rights for the creative work; and exercising, by executing a function of the rights smart contract in accordance with non-fungible token standard, the usage rights for the creative work based on the ownership token identifier and the rights token;

determining a credit for exercising the usage rights via the rights token; and providing, by executing a function of the rights smart contract on the public blockchain, the credit to the owner indicated by the ownership token for a use of the creative work based on the rights token.

16. The system of claim 15, wherein the at least one processing device is further configured to execute instructions stored in the at least one memory component to perform operations comprising:

obtaining a plurality of rights tokens corresponding to a plurality of creative works;

generating an additional creative work based on the plurality of creative works; and determining credits for a plurality of owners corresponding to the plurality of creative works based on the plurality of rights tokens.

17. A non-transitory computer-readable medium storing executable instructions, which when executed by a processing device of a computer system operating as part of a distributed virtual machine operated based on a public blockchain, cause the processing device to perform operations comprising:

executing an ownership smart contract to mint an ownership token on the public blockchain, wherein the ownership smart contract complies with a non-fungible token standard, and wherein the ownership token comprises a non-fungible token based on the non-fungible token standard on the public blockchain that indicates an owner of a creative work;

executing a function of the ownership smart contract in accordance with non-fungible token standard to assign ownership of the ownership token to a rights smart contract on the public blockchain by updating a key-value store of the ownership smart contract with an address of the rights smart contract in a block of the public blockchain;

receiving, via a function activation of a smart contract on the blockchain, input data including an ownership token identifier for the ownership token and a rights token including an indication of usage rights for the creative work;

minting, by executing a function of the rights smart contract in accordance with non-fungible token standard, a rights token for the creative work based on the input data and the ownership of the ownership token by the rights smart contract, wherein the rights token comprises another non-fungible token based on the non-fungible token standard of the public blockchain that indicates the usage rights for the creative work that are held by an owner of the rights token;

determining a credit for exercising the usage rights via the rights token; and providing the credit to the owner indicated by the ownership token for a use of the creative work based on the rights token by executing a function of the rights smart contract on the public blockchain.

18. The non-transitory computer-readable medium of claim 17, wherein the instructions are further executable to cause the processing device to perform operations comprising:

signing the creative work with an authentication signature, wherein the rights token includes a reference to the authentication signature.

19. The non-transitory computer-readable medium of claim 17, wherein the instructions are further executable to cause the processing device to perform operations comprising:

storing the creative work in a distributed file store, wherein the ownership token includes a Uniform Resource Locator (URL) for the creative work on the distributed file store.

20. The non-transitory computer-readable medium of claim 17, wherein the instructions are further executable to cause the processing device to perform operations comprising:

receiving, at the ownership smart contract on the distributed virtual machine, input data including a reference to the creative work; and minting, by the ownership smart contract, the ownership token.

* * * * *